Figure 1:
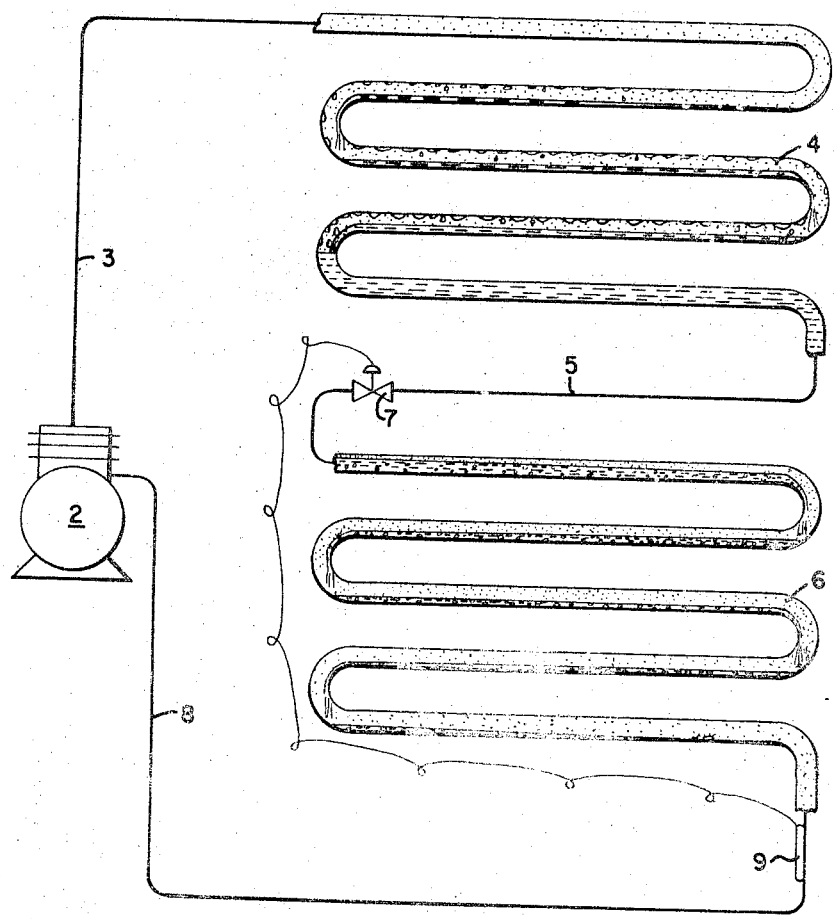

Aug. 22, 1967

P. J. LUNDE 3,336,763

REFRIGERATION SYSTEMS

Filed June 30, 1965

2 Sheets-Sheet 1

FIG. I

INVENTOR.
PETER J. LUNDE.
BY
ATTORNEY.

United States Patent Office 3,336,763
Patented Aug. 22, 1967

3,336,763
REFRIGERATION SYSTEMS
Peter J. Lunde, Cazenovia, N.Y., assignor to Carrier Corporation, Syracuse, N.Y., a corporation of Delaware
Filed June 30, 1965, Ser. No. 468,212
1 Claim. (Cl. 62—114)

This invention relates to refrigeration systems and to a process of producing refrigeration effect, and, more particularly, to a refrigeration system and process employing a mixture of refrigerants which approaches ideality, that is, a mixture in which each component exerts a vapor pressure proportional to its concentration.

Fluorinated hydrocarbons are in general use for a wide variety of refrigerating purposes. However, the fluorinated hydrocarbons employed today provide an insufficient choice of vapor pressure for many important refrigeration applications.

One class of mixtures, azeotropes, such as a mixture of dichlorodifluoromethane and unsymmetrical difluoroethane, has been found suitable for refrigerants. However, azeotropes have identical vapor and liquid compositions in equilibrium at one pressure and temperature and thus, for practical purposes, such mixtures act as a single compound and are of interest only for particular refrigeration applications.

Typically, non-azeotropic refrigerant mixtures exhibit large positive deviations from ideality so that their usefulness is limited because there are marked differences in equilibrium compositions of liquid and vapor over some part of the composition range. Such differences directly imply a large temperature rise during the evaporation of the mixture and a large temperature fall during condensation.

If an ideal mixture of two components is evaporated, as in a refrigeration system, the difference in temperature between that temperature at which evaporation starts, commonly called the bubble point, and that temperature at which evaporation is complete, known as the dew point, is much less than the difference between the boiling points of the two individual components. This property is true over the entire range of composition of mixtures of the two compounds when the mixture is ideal. Most refrigerant mixtures have large deviations from ideality and therefore large temperature changes during the phase change over at least a part of the composition range.

I have found that a mixture of monochlorodifluoromethane and difluoromethane closely approximates an ideal mixture when employed in compression refrigeration systems, such as systems employing reciprocating compressors. All proportions of this mixture exhibit only a small temperature change during a phase change, and hence are highly useful in the design of refrigeration systems since different proportions of the components in the mixture may be used thus greatly increasing the variety of design and applications in which the novel refrigerant may be employed.

The term "ideal mixture" is used herein to denote a mixture of refrigerants in which molecules of either component exert their own vapor pressure without interaction with their unlike neighbors. The term "substantially ideal mixture" is employed to designate a mixture of refrigerants which so closely approaches ideality, that temperature change during phase changes approximates that of an ideal mixture.

The chief object of the invention is to provide a refrigeration system and process of producing refrigeration effect employing a novel refrigerant.

An object of the present invention is to provide a novel refrigerant. Other objects of the invention will be readily perceived from the following description.

This invention relates to a refrigeration system including, in combination, a compressor, a condenser, expansion means and an evaporator placed in a closed circuit in such order, the circuit containing a refrigerant mixture consisting of difluoromethane and monochlorodifluoromethane adapted to be placed in heat exchange relation with a medium to be cooled.

The invention further relates to a process of producing refrigeration effect which consists in evaporating a refrigerant mixture consisting of difluoromethane and monochlorodifluoromethane in heat exchange relation with a medium to be cooled, then successively compressing and condensing the vapor, and repeating the process.

The invention further relates to a refrigerant for use in compression refrigeration systems consisting of a mixture of difluoromethane and monochlorodifluoromethane.

Figure 2:
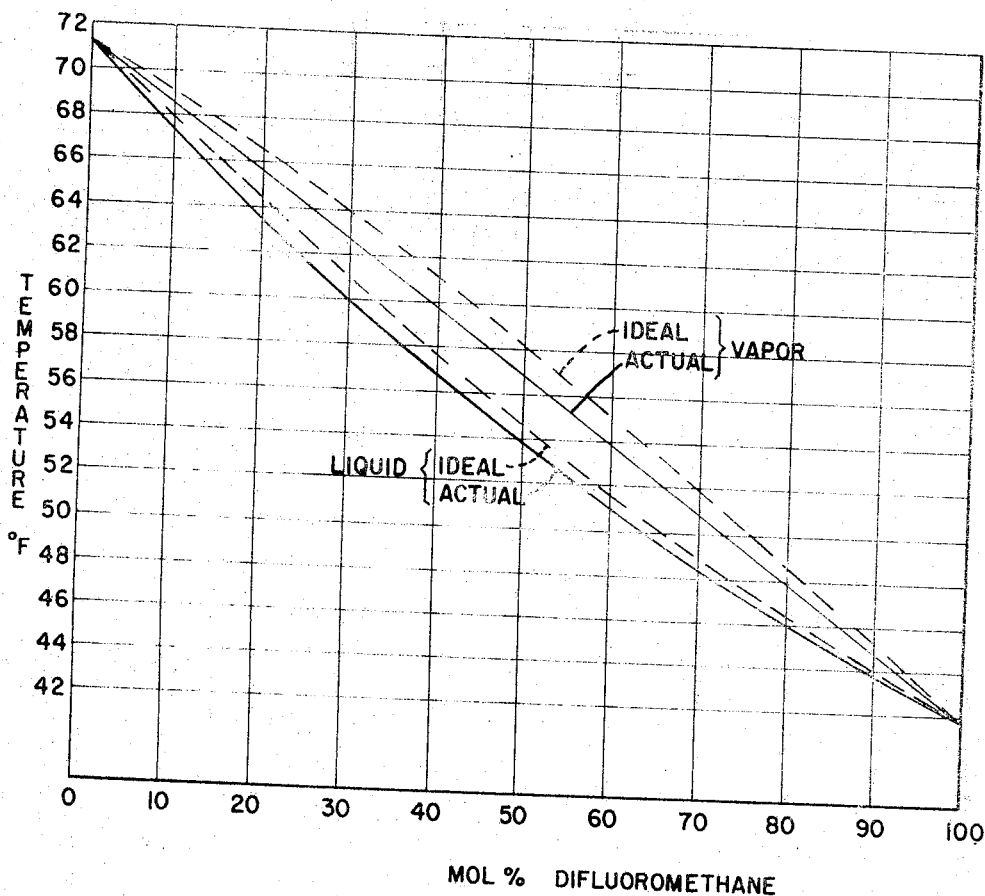

The attached drawings illustrate a preferred embodiment of the invention, in which FIGURE 1 is a diagrammatic view of a refrigeration system employing the present invention; and FIGURE 2 is a graph showing constant pressure equilibria for the novel refrigerant employed in the system shown in FIGURE 1.

Referring to the attached drawings, there is shown a refrigeration system which comprises a compressor 2 connected by discharge line 3 to a condenser 4. Condenser 4 is connected by liquid line 5 to an evaporator 6. Expansion means 7, such as an expansion valve or capillary, is placed in line 5 and regulates the passage of refrigerant to evaporator 6. Evaporator 6 is connected to the suction side of compressor 2 by line 8. If an expansion valve is employed, it is regulated by means of a bulb 9 placed in heat exchange relation with suction line 8.

The refrigerant in the system consists of a mixture of monochlorodifluoromethane and difluoromethane in any desired proportion depending upon the use to be made of the refrigeration system.

Difluoromethane has a critical temperature of about 173° F. and a critical pressure of about 833 pounds per square inch absolute. Monochlorodifluoromethane has a critical temperature of about 205° F. and a critical pressure of about 716 pounds per square inch absolute. The mixture is non-azeotropic.

FIGURE 2 discloses actual and ideal constant pressure equilibria for the refrigerant mixture. The solid lines show observed vapor and liquid temperatures at saturation for a mixture of monochlorodifluoromethane and difluoromethane, while the dotted line shows the ideal vapor and liquid temperatures for the mixture. It will be observed that the ideal phase change temperature change is small and deviations from ideality are also small so that actual temperature changes during phase changes are small resulting in an extremely satisfactory refrigerant for a wide variety of applications. Each component exerts a vapor pressure substantially proportional to the product of the pure component pressure and its molar concentration, so that the total pressure above such a mixture is substantially equal to the sum of the partial pressures of the components. Thus the difference in temperature between that temperature at which vaporization starts and the temperature at which vaporization is complete is in accordance with the above relationship between the components over the complete range of the components, and is less than the difference between the boiling points of the components.

It will be observed, referring to FIGURE 1, that during both evaporation and condensation, the mixture of difluoromethane and monochlorodifluoromethane functions generally similar to compounds rather than mixtures since molecules of either compound exert their own vapor pressure without interaction with their unlike neighbors and thus there are no more than a few degrees temperature change upon evaporation or condensation.

The present invention provides a refrigeration system employing a novel refrigerant mixture which functions with only slight degrees of temperature change regardless of the proportions of the compounds employed in the mixture.

The invention provides a wide range in design of refrigeration equipment since the proportions of the compounds employed in the mixture may be varied.

The novel refrigerant of the present invention may be employed with particular advantage when lower temperatures are desired than are conventional with monochlorodifluoromethane, but yet not so low that pure difluoromethane is a good choice.

Frequently, refrigeration equipment employing monochlorodifluoromethane as a refrigerant for use on 60 cycle current is sold in export to countries employing 50 cycle current, for example. The present invention provides a refrigerant which may be readily substituted for monochlorodifluoromethane in such equipment to increase substantially the capacity of the equipment when so utilized.

While I have described a preferred embodiment of the invention, it will be appreciated the invention is not limited thereto since it may be otherwise embodied within the scope of the following claim.

I claim:

In a refrigeration system, the combination of a compressor, a condenser, expansion means and an evaporator placed in a closed circuit in such order, the circuit containing a refrigerant mixture wherein the improvement comprises the mixture consisting of difluoromethane and monochlorodifluoromethane whereby the mixture functions with only slight degrees of temperature change regardless of the proportions of the compounds employed in the mixture.

References Cited

UNITED STATES PATENTS

| | | | |
|---|---|---|---|
| Re. 23,358 | 4/1951 | Reed et al. | 62—114 |
| 1,968,050 | 7/1934 | Midgley et al. | 252—67 |
| 2,255,584 | 9/1941 | Hubacker | 62—114 |
| 2,479,259 | 8/1949 | Reed et al. | 252—67 |
| 2,492,725 | 12/1949 | Ashley | 62—114 |
| 2,641,579 | 6/1953 | Benning | 252—67 |
| 3,019,614 | 2/1962 | Schubert et al. | 62—114 |
| 3,203,194 | 8/1965 | Fuderer | 62—114 |

LLOYD L. KING, *Primary Examiner.*